United States Patent
Letunovskiy et al.

(10) Patent No.: US 8,761,916 B2
(45) Date of Patent: Jun. 24, 2014

(54) HIGH-PERFORMANCE TONE DETECTION USING A DIGITAL SIGNAL PROCESSOR (DSP) HAVING MULTIPLE ARITHMETIC LOGIC UNITS (ALUS)

(75) Inventors: Aleksey Alexandrovich Letunovskiy, Tokarevka (RU); Ilya Viktorovich Lyalin, Moscow (RU); Alexander Markovic, Media, PA (US); Ivan Leonidovich Mazurenko, Khimki (RU); Andrey Anatolevich Nikitin, Moscow (RU)

(73) Assignee: LSI Corporation, San Jose, CA (US)

( * ) Notice: Subject to any disclaimer, the term of this patent is extended or adjusted under 35 U.S.C. 154(b) by 481 days.

(21) Appl. No.: 13/124,474

(22) PCT Filed: May 28, 2009

(86) PCT No.: PCT/RU2009/000268
§ 371 (c)(1),
(2), (4) Date: Apr. 15, 2011

(87) PCT Pub. No.: WO2010/138014
PCT Pub. Date: Dec. 2, 2010

(65) Prior Publication Data
US 2011/0200147 A1    Aug. 18, 2011

(51) Int. Cl.
*G06F 17/00*    (2006.01)
(52) U.S. Cl.
USPC .......................................... 700/94; 379/386
(58) Field of Classification Search
USPC ............... 455/570, 702; 379/74, 77, 88.07
See application file for complete search history.

(56) References Cited

U.S. PATENT DOCUMENTS 3,679,830 A    7/1972    Uffelman et al.
4,782,523 A    11/1988    Galand et al.
(Continued)

FOREIGN PATENT DOCUMENTS

WO    02010724 A1    12/2002

OTHER PUBLICATIONS

"Generic Tone Detection Using Teager-Kaiser Energy Operators on the StarCore SC140 Core," www.freescale.com, 2004 [retrieved on Aug. 20, 2010]. Retrieved from the Internet: <URL: http://www.freescale.com/files/dsp/doc/app_note/AN2384.pdf> pp. 1-28.
"MSC8156 Product Brief—Broadband Wireless Access DSP," www.ebv.com, 2008 [retrieved on Aug. 20, 2010]. Retrieved from the Internet: <URL: http://www.ebv.com/fileadmin/products/Products/Freescale/MSC8156/MSC8156_PB.pdf> pp. 1-6.

(Continued)

*Primary Examiner* — Fan Tsang
*Assistant Examiner* — David Siegel
(74) *Attorney, Agent, or Firm* — Mendelsohn, Drucker & Dunleavy, P.C.; Edward J. Meisarosh; Steve Mendelsohn

(57) ABSTRACT

In one embodiment, a DSP having four arithmetic logic units (ALUs) and able to have two read/write operations per clock cycle performs silence detection and tone detection for data frames containing samples of an audio signal. The ALUs are used together in parallel to process the samples in the data frames received by the DSP. A received data frame is filtered by the silence detection so that substantially silent frames are dropped and non-silent frames are further processed. In the tone detection, a filtered data frame is processed, four samples at a time, to determine the power of the signal at a given frequency, where the power determination is used to determine whether a given tone (i.e., a signal at a given frequency) is present in the data frame.

22 Claims, 4 Drawing Sheets

(56) References Cited

U.S. PATENT DOCUMENTS

| | | |
|---|---|---|
| 6,959,316 B2 | 10/2005 | Parviaien |
| 2002/0076034 A1* | 6/2002 | Prabhu et al. ............ 379/390.02 |
| 2003/0012358 A1 | 1/2003 | Kurtz et al. |
| 2007/0110042 A1 | 5/2007 | Li et al. |

OTHER PUBLICATIONS

International Search Report and Written Opinion for PCT/RU2009/000268 (International Filing Date: May 28, 2009) Mailing Date: Sep. 3, 2010 and Received on Sep. 24, 2010, 21 pages.

* cited by examiner

100

400

HIGH-PERFORMANCE TONE DETECTION USING A DIGITAL SIGNAL PROCESSOR (DSP) HAVING MULTIPLE ARITHMETIC LOGIC UNITS (ALUS)

BACKGROUND OF THE INVENTION

1. Field of the Invention

The current invention relates to digital signal processors (DSPs), and in particular, DSPs having multiple arithmetic logic units (ALUs).

2. Description of the Related Art

Conventional telephone keypads generate Dual Tone Multi Frequency (DTMF) signals when pressed. Pressing any particular key on a telephone keypad produces a unique combination of two tones, where a low tone represents the row of the key on the keypad and a high tone represents the column of the key on the keypad. The frequencies of the tones range from about 697 Hz to about 1633 Hz. Note that column frequency 1633 represents keys A, B, C, and D, where these keys, although part of DTMF signaling, are absent from many conventional telephone keypads. It should be noted that communication systems may produce other tone combinations comprising the same or a different number of tones at different frequencies. Corresponding communication equipment, such as equipment at a telephone company's central office that connects with the telephone, may need to be able to detect the presence of particular tones in a sample of audio content from the telephone.

Audio content in conventional modern telephone systems is usually digitized at a sampling rate of 8 kHz for processing and transmission by the telephone service provider(s). It should be noted that other sampling rates are possible. The digitized audio content is typically processed as data frames where each frame represents a window of time. Typical data frame lengths are 5 ms and 10 ms, which, at an 8 kHz sampling rate, are equivalent to 40 and 80 samples, respectively. A tone-detection decision is typically made once per frame. Several methods are known in the prior art for determining whether a frame contains audio content at a particular frequency.

The power P(F) of the input signal at a given frequency F in an N-sample data frame can be determined using the formula of Equation (1) below:

$$P(F) = \left| \sum_{k=1}^{N} x_k e^{-j\frac{2\pi F}{F_s}(N-k)} \right|^2, \quad (1)$$

where $x_1, x_2, \ldots, x_N$ are the samples of the frame, j is the square root of $-1$, and $F_s$ is the sampling frequency for the frame. The samples $x_1, x_2, \ldots, x_N$ represent voltage values of an electrical signal that represents corresponding sound pressure levels of an audio signal. Once the value of power P(F) is determined for the particular frame, that value is compared to a threshold and the result of the comparison is used in determining whether a tone at the given frequency has been detected for that frame.

Power P(F) for an N-sample frame can be calculated iteratively or recursively using the algorithm of Equation (2) below:

$$Re(0) = Im(0) = 0 \quad (2.1)$$

$$Re(n) = x_n + \cos\left(\frac{2\pi F}{F_s}\right) \cdot Re(n-1) - \sin\left(\frac{2\pi F}{F_s}\right) \cdot Im(n-1),$$

and $$Im(n) = \sin\left(\frac{2\pi F}{F_s}\right) \cdot Re(n-1) + \cos\left(\frac{2\pi F}{F_s}\right) \cdot Im(n-1) \quad (2.2)$$

for $n = 1, 2, \ldots, N$ $$P(F) = Re(N)^2 + Im(N)^2 \quad (2.3)$$

Equation (2) calls for calculating values for Re(n) and Im(n) for each sample of the frame. The calculations for each sample are based on the values of $x_n$, Re(n−1), and Im(n−1) (where Re(0) and Im(0) are 0). Power P(F) is then calculated for the N-sample frame based on Re(N) and Im(N). It should be noted that, generally, a recursive calculation would involve implementing the calculation using a procedure that calls itself repeatedly (e.g., N times) until some condition is met, while an iterative calculation would involve implementing the calculation using a procedure that includes an explicit instruction loop that is executed a certain number (e.g., N) of times. Thus, to illustrate a recursive function, a recursive pseudo-code implementation for a factorial function could be factorial(n) where if n=0 then return 1 else return n·factorial (n−1). Similarly, to illustrate an iterative function, an iterative pseudo-code implementation for a factorial function could be factorial(n) where temp=1; for i=2 to n, temp=temp·i; return temp. Since, generally, recursive algorithms can be transformed into corresponding iterative algorithms and vice-versa, the terms, as used herein, unless otherwise indicated, are interchangeable.

Another iterative or recursive way to calculate power P(F) for an N-sample frame involves using the Goertzel algorithm, as shown in Equation (3) below:

$$S(0) = S(-1) = 0 \quad (3.1)$$

$$S(n) = x_n + 2\cos\left(\frac{2\pi F}{F_s}\right) \cdot S(n-1) - S(n-2) \quad (3.2)$$

for $n = 1, 2, \ldots, N$ $$P(F) = S(N)^2 - 2\cos\left(\frac{2\pi F}{F_s}\right) \cdot S(N) \cdot S(N-1) + S(N-1)^2 \quad (3.3)$$

The Goertzel algorithm involves calculating an N-item series of values from S(1) to S(N) for the samples $x_1, x_2, \ldots, x_N$ of the frame, where each S(n) value is based on $x_n$, S(n−1), and S(n−2), and where S(0) and S(−1) are 0. Power P(F) for the N-sample frame is then calculated based on the last two values of the series, i.e., S(N) and S(N−1).

When any of the above calculations are performed by a processor, such as an Application-Specific Integrated Circuit (ASIC) or a Digital Signal Processor (DSP), slight modifications may be made to the formulas to account for the limitations of the fixed-point arithmetic that may be used by those processors. For example, a saturation function may be used to implement saturation arithmetic where results of arithmetic operations, which may otherwise overflow, are clamped between a maximum value and a minimum value. Saturation may also be used in rounding off numbers, such as, for example, in converting a 32-bit fixed-point number into a 16-bit fixed-point number. 32-bit fixed-point numbers are also known as Q31- or Q1.31-format numbers, where the 31 represents the number of bits after the binary point (i.e., the binary equivalent of a decimal point) and the 1, when present, represents the number of bits before the binary point. It should be noted that, in general, if no number is present before the binary point (e.g., Q31), it is assumed that "1" is intended there (i.e., Q1.31). Similarly, 16-bit fixed-point numbers are known as Q15-format or Q1.15-format numbers. As used herein, unless otherwise noted, references to Qc.15 and Qc.31 formats indicate generic format references that include formats with zero or more bits before the binary point. Thus, for example, the term Qc.31 format includes Q0.31, Q1.31, Q2.31, etc. formats.

In some implementations of a saturation function, the saturation function merely discards the least significant bits of the saturated number. This can cause round-off errors which may be corrected using an additive correction. Thus, if, for example, a saturation function SAT [a] discards the 16 least significant bits when saturating 32-bit number a to 16-bit number a', then an additive correction of $2^{-16}$ may be used so that $SAT[a+2^{-16}]$ functions like a rounding-off function round[a] for rounding off a to a 16-bit number. An illustrative decimal example may be helpful to understand how this works. Suppose that the decimal-number function SAT[a] discards the digits after the decimal point of a. Thus, SAT[5.5] would result in 5, while SAT[4.99] would result in 4. Using an additive correction of 0.5, SAT[a+0.5] can be used as a rounding-off function where, for example, (a) SAT[5.5+0.5]=SAT[6.0]=6=round(5.5) and (b) SAT[4.99+0.5]=SAT[5.49]=5=round[4.99].

Equation (2) can be modified to accommodate the above-described saturation and additive correction, and also incorporate a normalization factor, as shown in Equation (4) below:

$$Re(0) = Im(0) = 0 \quad (4.1)$$

$$Re(n) = SAT\left[2^{-16} + M \cdot x_n + \cos\left(\frac{2\pi F}{F_s}\right) \cdot Re(n-1) - \sin\left(\frac{2\pi F}{F_s}\right) \cdot Im(n-1)\right],$$

and $$Im(n) = SAT\left[2^{-16} + \sin\left(\frac{2\pi F}{F_s}\right) \cdot Re(n-1) + \cos\left(\frac{2\pi F}{F_s}\right) \cdot Im(n-1)\right] \quad (4.2)$$

for $n = 1, 2, \ldots, N$ $$P(F) = SAT[2^{-16} + Re(N)^2 + Im(N)^2] \quad (4.3)$$

where M is a pre-calculated normalization factor, SAT[ ] represents a saturation function for truncating Q c.31 numbers to Q c.15 format, and $2^{-16}$ is an additive correction factor to make saturation function SAT[ ] operate like a rounding-off function. Normalization is a process of adjusting data points in order to have them fit some particular rule, and is commonly used in signal processing. Note that, in a recursive implementation, the calculation would start with trying to determine Re(N) and Im(N), which would involve determining Re(N−1) and Im(N−1), which would in turn involve determining Re(N−2) and Im(N−2), and so forth down to Re(0) and Im(0). In contrast, an iterative implementation would involve first calculating Re(1) and Im(1) and then using the results to calculate Re(2) and Im(2), and so forth up to Re(N) and Im(N).

A conventional DSP would require 3N+O(1) clock cycles to calculate power P(F) using Equation (4). It should be noted that O(1) is in "big O" notation and represents a function bound by a constant and not dependent on N. Thus, for a 40-sample data frame (i.e., N=40) assuming, for example, O(1)=10, a conventional DSP would require 130 clock cycles to calculate power P(F) for the data frame using Equation (4). The DSP requires 2 clock cycles to perform multiplication operations, including multiply-and-accumulate (MAC) operations and multiply-and-subtract (MSU) operations. A MAC instruction operates such that MAC (a, b, c) adds the product of a and b to c, i.e., c=c+a·b. An MSU instruction operates such that MSU (a, b, c) subtracts the product of a and b from c, i.e., c=c−a·b. Since $\cos(2\pi F/F_s)$ and $\sin(2\pi F/F_s)$ are constants, they can be pre-calculated once and stored for use by each iteration. Each iteration of Equation (4.2) requires several MAC and MSU operations that take 2 clock cycles per iteration. Saturation requires another clock cycle per iteration. Equation (4.2) could be modified to remove the saturation function. This will make the procedure unstable and therefore liable to overflow and provide erroneous results, but would also reduce the number of cycles required for processing an N-sample frame to 2N+O(1) clock cycles.

Equation (3) can also be modified to accommodate the above-described saturation, additive correction, and normalization, as shown in Equation (5) below:

$$S(0) = S(-1) = 0 \quad (5.1)$$

$$S(n) = SAT\left[2^{-16} + M \cdot x_n + 2\cos\left(\frac{2\pi F}{F_s}\right) \cdot S(n-1) - S(n-2)\right] \quad (5.2)$$

for $n = 1, 2, \ldots, N$ $$P(F) = \quad (5.3)$$

$$SAT\left[2^{-16} + S(N)^2 - 2\cos\left(\frac{2\pi F}{F_s}\right) \cdot S(N) \cdot S(N-1) + S(N-1)^2\right]$$

where M is a pre-calculated normalization factor, SAT[ ] represents a saturation function for truncating Q c.31 numbers to Q c.15 format, and $2^{-16}$ is an additive correction.

A conventional DSP would require at least 4N+O(1) clock cycles to calculate power P(F) in accordance with Equation (5). It should be noted that, in some implementations, the DSP can store 2 $\cos(2\pi F/F_s)$ as a constant only if $\cos(2\pi F/F_s)$ is substantially between −0.5 and 0.5; otherwise, that DSP stores $\cos(2\pi F/F_s)$ as a constant and multiplies it by 2 in every iteration. In other implementations, the DSP can store 2 cos $(2\pi F/F_s)$ as a constant regardless of the value of $\cos(2\pi F/F_s)$.

Assuming 2 cos(2πF/$F_s$) is stored as a constant, each iteration of Equation (5.2) requires MAC, multiplication, subtraction, and saturation operations that take 3 clock cycles per sample. Saturation requires another clock cycle per iteration. Equation (5.2) could be modified to remove the saturation function. However, that will make the procedure unstable and therefore liable to overflow and provide erroneous results, but would also reduce the number of cycles required for processing an N-sample frame to 3N+O(1) clock cycles.

Some DSPs have multiple arithmetic logic units (ALUs) and multiple input/output (I/O) units that can process multiple instructions in a single clock cycle utilizing the multiple ALUs, multiple I/O units, and a pipeline architecture. A pipeline architecture allows the preparation of variables for a next iteration during a current iteration. Thus, after the first few clock cycles of a data set during which the pipeline is loaded and before the last few clock cycles of the data set during which the pipeline is unloaded, the DSP operates with a loaded pipeline, where extra clock cycles are not needed to load data for use by the ALUs since the pipeline is continually loaded as the ALUs perform their arithmetic operations. Conventional tone-power calculation systems might not make optimal use of these features of such DSPs.

SUMMARY OF THE INVENTION

One embodiment of the invention can be a digital signal processor (DSP) comprising a plurality D of arithmetic logic units (ALUs). The DSP is adapted to (a) receive a data frame comprising digital samples corresponding to an audio signal and (b) perform at least one of tone detection and silence detection for the data frame using the plurality of ALUs in parallel. The tone detection comprises (i) determining a power P(F) of a frequency F for the data frame and (ii) thresholding the determined power P(F) to determine whether a tone corresponding to the frequency F is present in the audio signal. The silence detection comprises filtering a given frequency range of the signal.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
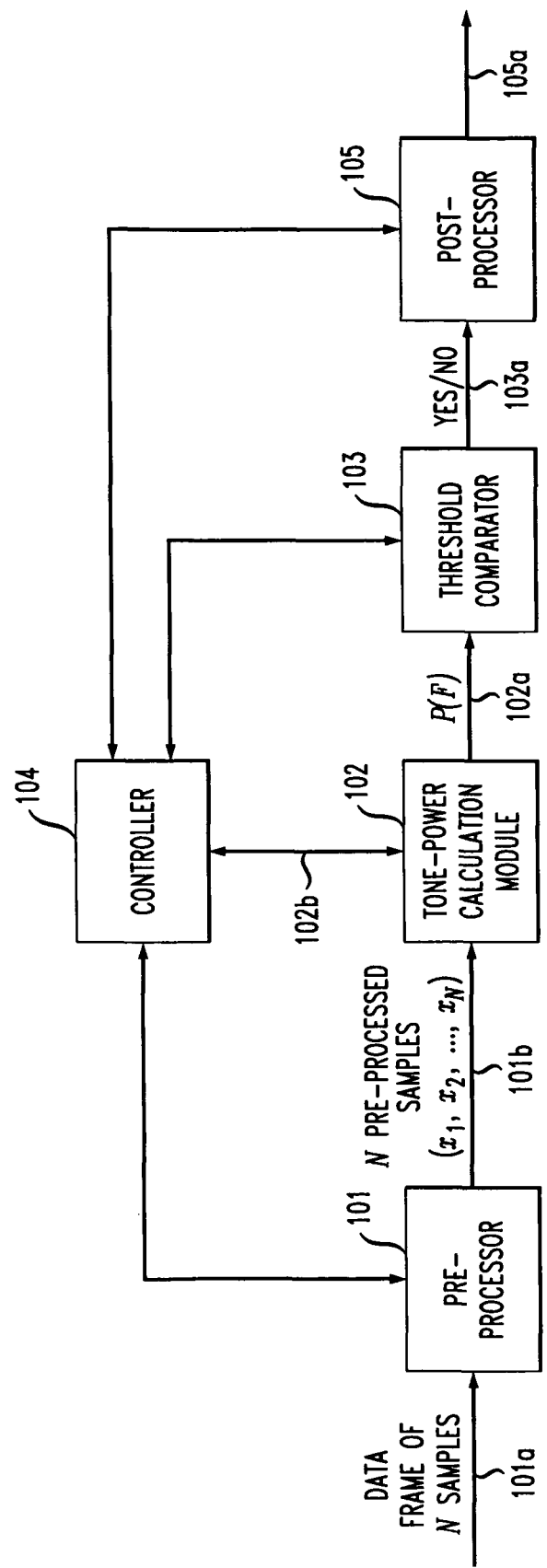
FIG. 1 shows a simplified block diagram of a tone-detection system in accordance with one embodiment of the present invention.

FIG. 1 shows a simplified block diagram of tone-detection system 100 in accordance with one embodiment of the invention. Tone-detection system 100 comprises pre-processor 101, tone-power calculation module 102, threshold comparator 103, controller 104, and post-processor 105. Pre-processor 101 receives a data frame of N samples via data bus 101a. Pre-processor 101 performs appropriate pre-processing, such as filtering and automatic gain control, for the data frame and provides to tone-power calculation module 102, via data bus 101b, the pre-processed frame of length N in the form of samples $x_1, x_2, \ldots, x_N$. Tone-power calculation module 102 determines power P(F) for the frame, and provides that power P(F) to threshold comparator 103 via data bus 102a. Threshold comparator 103 determines whether or not power P(F) meets a pre-determined threshold. Threshold comparator 103 then outputs a corresponding yes or no via path 103a to post-processor 105, which uses that determination to generate output 105a, which is the output of tone-detection system 100. Controller 104 is connected to and controls the various components of tone-detection system 100.

Figure 2:
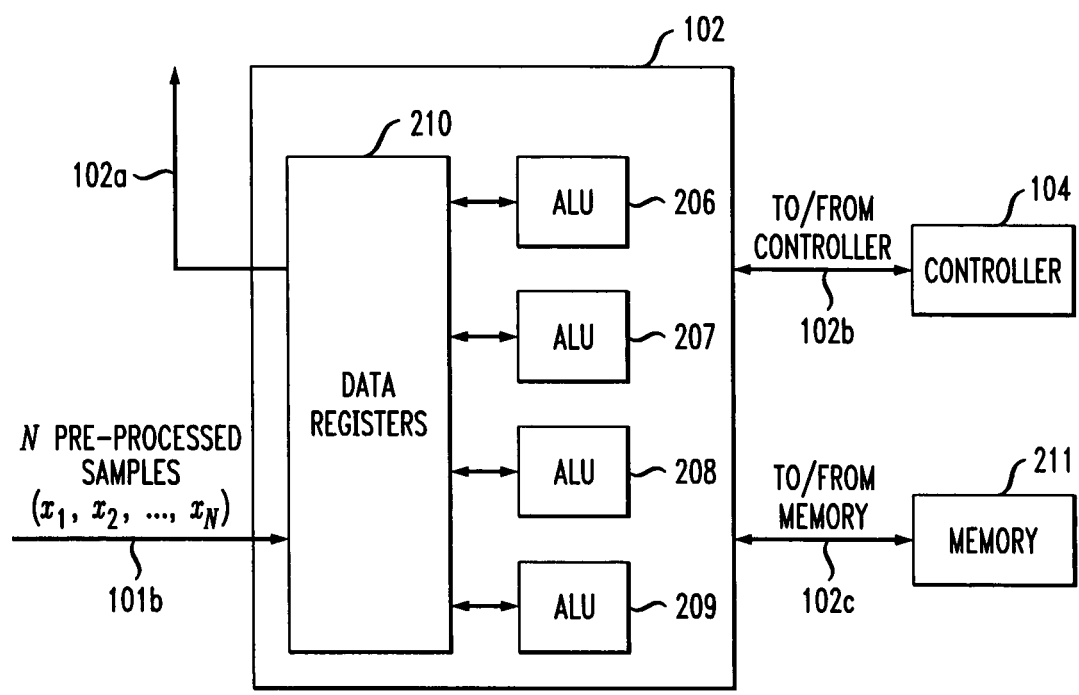
FIG. 2 shows a simplified block diagram of an implementation of the tone-power calculation module of FIG. 1.

FIG. 2 shows a simplified block diagram of an implementation of tone-power calculation module 102 of FIG. 1. A frame of N samples $x_1, x_2, \ldots, x_N$ is provided to data registers module 210 via data bus 101b. The samples are provided as needed. The samples are accessed by ALUs 206, 207, 208, and 209, which use the sample values stored in data registers module 210 to calculate power P(F) for the frame. Only a few sample values need to be in data registers module 210 during any clock cycle. The samples are pipelined through data registers module 210 as the calculation progresses. Data registers module 210 comprises registers used to store intermediate values used in calculating power P(F). The flow of data in data registers module 210 and the operations performed by ALUs 206, 207, 208, and 209 are determined by DSP controller 104 of FIG. 1, which provides instructions to tone-power calculation module 102 via path 102b. Tone-power calculation module 102 communicates with electronic memory 211 for storing and retrieving information via path ACc.

The tone-power calculation formula of Equation (4) can be transformed into the formulation of Equation (6) below for an accelerated calculation of power P(F) that requires only 0.75N+O(1) clock cycles:

$$\text{Re}_1(0) = 2^{-16} \cdot \sum_{k=0}^{N-1} \left[\cos\left(\frac{2\pi F}{F_s}k\right) - \sin\left(\frac{2\pi F}{F_s}k\right)\right]$$

$$\text{Im}_1(0) = 2^{-16} \cdot \sum_{k=0}^{N-1} \left[\cos\left(\frac{2\pi F}{F_s}k\right) + \sin\left(\frac{2\pi F}{F_s}k\right)\right]$$

$$\text{Re}_2(0) = \text{Im}_2(0) = 0$$

for $$n = 1, 2, \ldots, \frac{N}{4} \begin{cases} V_a(n) = M \cdot x_{4n-4+a} \text{ for } a = 1, 2, 3, 4 & (6.1)\text{-}(6.4) \\ \text{Re}_1(n) = \text{Re}_1(n-1) + V_1(n) \cdot \cos\left(\frac{2\pi F}{F_s}(N - 4n + 3)\right) & (6.5) \\ \text{Im}_1(n) = \text{Im}_1(n-1) + V_1(n) \cdot \sin\left(\frac{2\pi F}{F_s}(N - 4n + 3)\right) & (6.6) \\ \text{Re}_2(n) = \text{Re}_2(n-1) + V_2(n) \cdot \cos\left(\frac{2\pi F}{F_s}(N - 4n + 2)\right) & (6.7) \\ \text{Im}_2(n) = \text{Im}_2(n-1) + V_2(n) \cdot \sin\left(\frac{2\pi F}{F_s}(N - 4n + 2)\right) & (6.8) \\ \text{Re}_1(n) = \text{Re}_1(n) + V_3(n) \cdot \cos\left(\frac{2\pi F}{F_s}(N - 4n + 1)\right) & (6.9) \\ \text{Im}_1(n) = \text{Im}_1(n) + V_3(n) \cdot \sin\left(\frac{2\pi F}{F_s}(N - 4n + 1)\right) & (6.10) \\ \text{Re}_2(n) = \text{Re}_2(n) + V_4(n) \cdot \cos\left(\frac{2\pi F}{F_s}(N - 4n)\right) & (6.11) \\ \text{Im}_2(n) = \text{Im}_2(n) + V_4(n) \cdot \sin\left(\frac{2\pi F}{F_s}(N - 4n)\right) & (6.12) \end{cases}$$

$$P(F) = SAT[2^{-16} + (SAT[\text{Re}_1(N/4) + \text{Re}_2(N/4)])^2 + (SAT[\text{Im}_1(N/4) + \text{Im}_2(N/4)])^2] \quad (6.13)$$

It should be noted that the additive correction here ($2^{-16}$) is multiplied in the Equation (6) algorithm as an operational shortcut; it still functions as an additive correction in the algorithm. Equation (6) runs only one fourth of the iterations of Equation (4), with each iteration still requiring 3 clock cycles, thereby reducing the clock cycles for a frame of length N from 3N+O(1) to 0.75N+O(1). Multiple operations can be performed in each clock cycle by using parallel processing, i.e., simultaneously using ALUs 206, 207, 208, and 209 of FIG. 2. $\text{Re}_1(n)$, $\text{Re}_2(n)$, $\text{Im}_1(n)$, and $\text{Im}_2(n)$ refer to various intermediate values calculated on the way to calculating the values $\text{Re}_1(N/4)$, $\text{Re}_2(N/4)$, $\text{Im}_1(N/4)$, and $\text{Im}_2(N/4)$, which are determined in the final four steps, i.e., steps (6.9)-(6.12), of iteration number N/4, and which are used to calculate power P(F) for the N-sample frame.

For example, for a 40-sample frame, the equations for the first iteration, i.e., where n=1, are shown below:

$$V_1(1) = M \cdot x_1 \quad (6.1)$$

$$V_2(1) = M \cdot x_2 \quad (6.2)$$

$$V_3(1) = M \cdot x_3 \quad (6.3)$$

$$V_4(1) = M \cdot x_4 \quad (6.4)$$

$$\text{Re}_1(1) = \text{Re}_1(0) + V_1(1) \cdot \cos\left(\frac{2\pi F}{F_s}(39)\right) \quad (6.5)$$

$$\text{Im}_1(1) = \text{Im}_1(0) + V_1(1) \cdot \sin\left(\frac{2\pi F}{F_s}(39)\right) \quad (6.6)$$

$$\text{Re}_2(1) = \text{Re}_2(0) + V_2(1) \cdot \cos\left(\frac{2\pi F}{F_s}(38)\right) \quad (6.7)$$

$$\text{Im}_2(1) = \text{Im}_2(0) + V_2(1) \cdot \sin\left(\frac{2\pi F}{F_s}(38)\right) \quad (6.8)$$

$$\text{Re}_1(1) = \text{Re}_1(1) + V_3(1) \cdot \cos\left(\frac{2\pi F}{F_s}(37)\right) \quad (6.9)$$

$$\text{Im}_1(1) = \text{Im}_1(1) + V_3(1) \cdot \sin\left(\frac{2\pi F}{F_s}(37)\right) \quad (6.10)$$

-continued $$\text{Re}_2(1) = \text{Re}_2(1) + V_4(1) \cdot \cos\left(\frac{2\pi F}{F_s}(36)\right) \quad (6.11)$$

$$\text{Im}_2(1) = \text{Im}_2(1) + V_4(1) \cdot \sin\left(\frac{2\pi F}{F_s}(36)\right) \quad (6.12)$$

Note that each iteration comprises 12 steps that can be divided into three sets of four steps. In the first four steps of each iteration, i.e., steps (6.1)-(6.4), values are calculated for $V_1(n)$, $V_2(n)$, $V_3(n)$, and $V_4(n)$ based on the samples $x_{4n-3}$, $x_{4n-2}$, $x_{4n-1}$, and $x_{4n}$, respectively. In the middle four steps of each iteration, i.e., steps (6.5)-(6.8), temporary values of $\text{Re}_1(n)$, $\text{Re}_2(n)$, $\text{Im}_1(n)$, and $\text{Im}_2(n)$ are calculated. In the final four steps of each iteration, i.e., steps (6.9)-(6.12), the temporary values of $\text{Re}_1(n)$, $\text{Re}_2(n)$, $\text{Im}_1(n)$, and $\text{Im}_2(n)$ are overwritten with newly calculated intermediate values. These intermediate values may be stored in a data array. It is more efficient, however, to use memory-storage (MS) modules to hold the temporary and intermediate values of $\text{Re}_1(n)$, $\text{Re}_2(n)$, $\text{Im}_1(n)$, and $\text{Im}_2(n)$, overwriting the old values as new corresponding values are calculated based on the old values. The values and their corresponding variable names and MS modules are represented as $\text{Re}_1$, $\text{Re}_2$, $\text{Im}_1$, and $\text{Im}_2$. Depending on the particular implementation, MS modules could be implemented using data registers, cache, random access memory (RAM), EEPROM, and/or any other suitable memory. In FIG. 2, one or both of data registers module 210 and memory 211 comprise MS modules. In general, an MS module refers to an addressable segment of memory, where the segment is addressable using an address, an offset, and/or any other suitable addressing technology.

In one implementation of tone-power calculation module 102, MS modules $\text{Re}_1$, $\text{Re}_2$, $\text{Im}_1$, and $\text{Im}_2$ are updated with each iteration, based on the old values of the MS modules, as reflected by the formulation of Equation (7) below, which is based on Equations (6.1)-(6.12):

$$\text{initialize} \begin{cases} \text{Re}_1 = 2^{-16} \cdot \sum_{k=0}^{N-1} \left[ \cos\left(\frac{2\pi F}{F_s}k\right) - \sin\left(\frac{2\pi F}{F_s}k\right) \right] \\ \text{Im}_1 = 2^{-16} \cdot \sum_{k=0}^{N-1} \left[ \cos\left(\frac{2\pi F}{F_s}k\right) + \sin\left(\frac{2\pi F}{F_s}k\right) \right] \\ \text{Re}_2 = \text{Im}_2 = 0 \end{cases}$$

for $$n = 1, 2, \ldots, \frac{N}{4} \begin{cases} V_a = M \cdot x_{4n-4+a} \text{ for } a = 1, 2, 3, 4 & (7.1)\text{-}(7.4) \\ \text{Re}_1 = \text{Re}_1 + V_1 \cdot \cos\left(\frac{2\pi F}{F_s}(N - 4n + 3)\right) & (7.5) \\ \text{Im}_1 = \text{Im}_1 + V_1 \cdot \sin\left(\frac{2\pi F}{F_s}(N - 4n + 3)\right) & (7.6) \\ \text{Re}_2 = \text{Re}_2 + V_2 \cdot \cos\left(\frac{2\pi F}{F_s}(N - 4n + 2)\right) & (7.7) \\ \text{Im}_2 = \text{Im}_2 + V_2 \cdot \sin\left(\frac{2\pi F}{F_s}(N - 4n + 2)\right) & (7.8) \\ \text{Re}_1 = \text{Re}_1 + V_3 \cdot \cos\left(\frac{2\pi F}{F_s}(N - 4n + 1)\right) & (7.9) \\ \text{Im}_1 = \text{Im}_1 + V_3 \cdot \sin\left(\frac{2\pi F}{F_s}(N - 4n + 1)\right) & (7.10) \\ \text{Re}_2 = \text{Re}_2 + V_4 \cdot \cos\left(\frac{2\pi F}{F_s}(N - 4n)\right) & (7.11) \\ \text{Im}_2 = \text{Im}_2 + V_4 \cdot \sin\left(\frac{2\pi F}{F_s}(N - 4n)\right) & (7.12) \end{cases}$$

$$P(F) = SAT[2^{-16} + (SAT[\text{Re}_1 + \text{Re}_2])^2 + (SAT[\text{Im}_1 + \text{Im}_2])^2] \quad (7.13)$$

After variables $\text{Re}_1$, $\text{Re}_2$, $\text{Im}_1$, and $\text{Im}_2$ are initialized, each iteration of N/4 iterations requires 12 arithmetic operations, which are carried out by tone-power calculation module 102. Operations (7.1)-(7.4) can be carried out together in parallel and in one cycle by ALUs 206, 207, 208, and 209. Operations (7.5)-(7.8) can also be carried out together in parallel and in one cycle by ALUs 206, 207, 208, and 209. And operations (7.9)-(7.12) can also be carried out together in parallel and in one cycle by ALUs 206, 207, 208, and 209. An exemplary description of the operation of tone-power calculation module 102 processing 40-sample data frames is provided below.

The values of $\cos(2\pi F \cdot k/F_s)$ and $\sin(2\pi F \cdot k/F_s)$ for k=1 to 40, which are constant (assuming F, $F_s$, and N are not changed between frames), used in every frame, and do not depend on particular data-sample (i.e., $x_n$) values, may be calculated before any frame is fully processed, and the calculated values may then be stored in memory for use in subsequent frames. The value of normalization constant M may similarly be stored in memory 211. These constants may then be read into data registers 210 via path ACc as needed by tone-power calculation module 102. Storing frequently used constants in memory and using them as necessary, rather than recalculating their value every time they are needed, reduces the number of calculations needed per frame and, consequently, frame-processing time.

Figure 3:
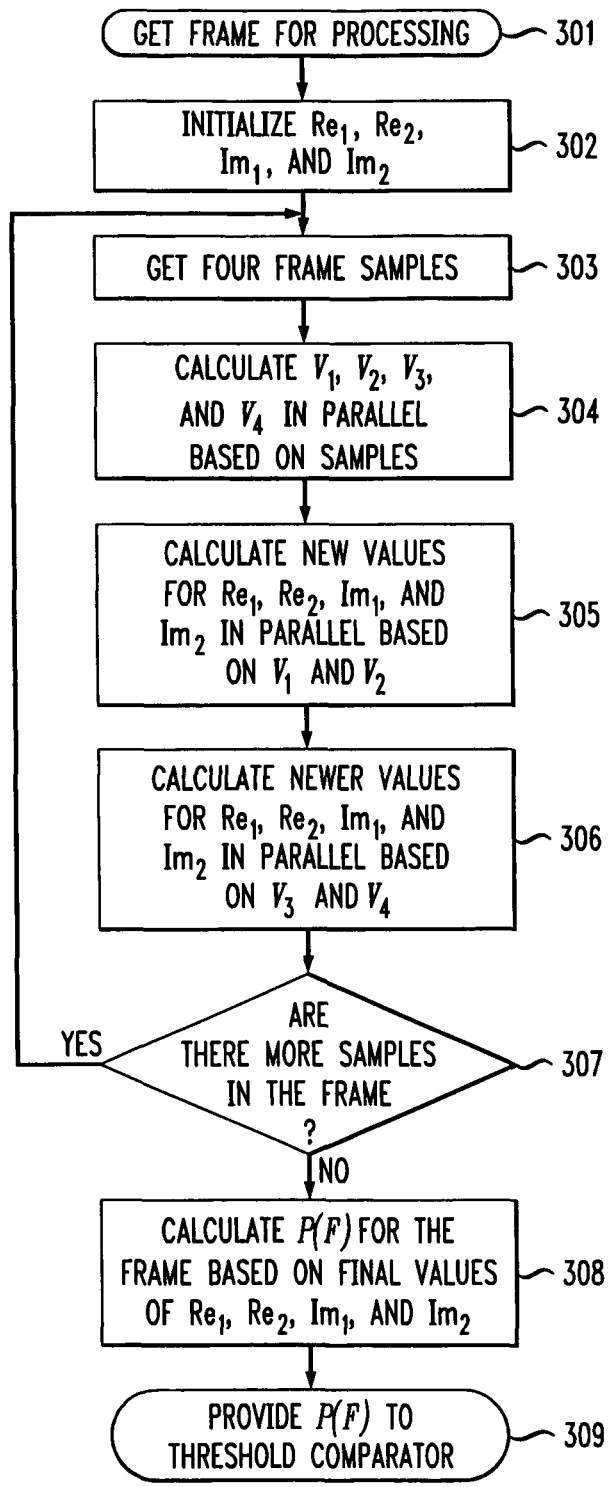
FIG. 3 shows a flowchart for an exemplary implementation of the processing of a 40-sample frame.

FIG. 3 shows flowchart 300 for an exemplary implementation for the processing of a 40-sample frame using the algorithm of Equation (7). Frame processing commences with getting the frame for processing (step 301). Next, $\text{Re}_1$, $\text{Re}_2$, $\text{Im}_1$, and $\text{Im}_2$ are initialized (step 302). The initialization values in every frame for variables $\text{Re}_1$, $\text{Re}_2$, $\text{Im}_1$, and $\text{Im}_2$ are constant. The initial values of $\text{Re}_2$ and $\text{Im}_2$ are 0, while $\text{Re}_1$ and $\text{Im}_1$ are initialized using the calculated values of cos $(2\pi F \cdot k/F_s)$ and $\sin(2\pi F \cdot k/F_s)$. Since the initial values of $\text{Re}_1$ and $\text{Im}_1$ are the same for every frame, they may also be calculated before any frames are received and stored in memory for retrieval and use as needed. The initial values of $\text{Re}_2$ and $\text{Im}_2$ may also be stored in memory, but since those initial values are 0, they may simply be set to 0 at the start of processing of every frame (step 302). After variables $\text{Re}_1$, $\text{Re}_2$, $\text{Im}_1$, and $\text{Im}_2$ are initialized for the frame, the process enters the first of 10 iterations for the 40-sample frame (steps 303-307). Each iteration processes four consecutive samples of the forty samples of the frame and proceeds as described below.

First, the four samples are retrieved (step 303). Next, $V_1$, $V_2$, $V_3$, and $V_4$ are calculated for the four samples, in parallel, using ALUs 206, 207, 208, and 209, in accordance with Equations (7.1)-(7.4) (step 304). The calculated values are then stored in the appropriate MS modules. Next, ALUs 206, 207, 208, and 209 calculate, in parallel, new values for variables $\text{Re}_1$, $\text{Re}_2$, $\text{Im}_1$, and $\text{Im}_2$ based on $V_1$ and $V_2$, in accordance with Equations (7.5)-(7.8) (step 305). Then, ALUs 206, 207, 208, and 209 calculate, in parallel, newer values for variables $\text{Re}_1$, $\text{Re}_2$, $\text{Im}_1$, and $\text{Im}_2$ based on $V_3$ and $V_4$, in accordance with Equations (7.9)-(7.12) (step 306). If there are more samples in the frame, then the next iteration is commenced (step 307). After all the iterations are completed, power P(F) is calculated based on the final values of variables $\text{Re}_1$, $\text{Re}_2$, $\text{Im}_1$, and $\text{Im}_2$ for the frame, in accordance with Equation (7.13) (step 308). The value of power P(F) is then provided to threshold comparator 103 of FIG. 1 via path 102a, and the process terminates for the frame (step 309).

As would be appreciated by one of ordinary skill in the art, the above-described embodiment may be implemented in a variety of ways without departing from the scope of the invention. One typical implementation is defined using Assembler code. The Assembler code may define N/4 loops or may combine iterations to have fewer loops. Particular programming choices may vary depending on implementation-specific factors such as the number of registers available in data registers module 210, the number format for numbers stored in those registers, the number format for numbers stored in memory 211, and other factors specific to tone-power calculation module 102 and related modules.

In one alternative embodiment, N/8 iterations are used to process an N-sample frame of samples $x_1, x_2, \ldots, x_N$. The corresponding tone-power calculation, based on Equation (4), is represented in Equation (8) below, where $\alpha = 2\pi F/F_s$, M is a normalization factor, $2^{-16}$ is an additive correction factor, and SAT[ ] is a saturation function.

$Re(0) = Im(0) = 0$ (8.1)

for $n = 1, 2, \ldots,$ (8.2)

$$\frac{N}{8}\begin{cases} Re_1(n) = 2^{-16} \cdot \sum_{k=0}^{3}[\cos(k\alpha) - \sin(k\alpha)] + \sum_{k=1}^{3}[\cos(k\alpha) \cdot M \cdot x_{8n-4-k}] + \\ \qquad \cos(4\alpha) \cdot Re(n-1) - \sin(4\alpha) \cdot Im(n-1) + M \cdot x_{8n-4} \\ Im_1(n) = 2^{-16} \cdot \sum_{k=0}^{3}[\cos(k\alpha) + \sin(k\alpha)] + \sum_{k=1}^{3}[\sin(k\alpha) \cdot M \cdot x_{8n-4-k}] + \\ \qquad \sin(4\alpha) \cdot Re(n-1) + \cos(4\alpha) \cdot Im(n-1) \\ Re(n) = SAT[Re_1(n)], Im(n) = SAT[Im_1(n)] \\ Re_2(n) = 2^{-16} \cdot \sum_{k=0}^{3}[\cos(k\alpha) - \sin(k\alpha)] + \sum_{k=1}^{3}[\cos(k\alpha) \cdot M \cdot x_{8n-k}] + \\ \qquad \cos(4\alpha) \cdot Re(n) - \sin(4\alpha) \cdot Im(n) + M \cdot x_{8n} \\ Im_2(n) = 2^{-16} \cdot \sum_{k=0}^{3}[\cos(k\alpha) + \sin(k\alpha)] + \sum_{k=1}^{3}[\sin(k\alpha) \cdot M \cdot x_{8n-k}] + \\ \qquad \sin(4\alpha) \cdot Re(n) + \cos(4\alpha) \cdot Im(n) \\ Re(n) = SAT[Re_2(n)], Im(n) = SAT[Im_2(n)] \end{cases}$$

$P(F) = Re(N/8)^2 + Im(N/8)^2$ (8.3)

A more-detailed formulation appears below as Equation 30 (9).

$Re(0) = Im(0) = 0$ $n = 1, 2, \ldots, \dfrac{N}{8}$
$\begin{cases}
V_a(n) = M \cdot x_{8n-8+a} \quad a = 1, 2, \ldots 8 & (9.1)\text{-}(9.8) \\
Re_1(n) = 2^{-16} \cdot \sum_{k=0}^{3}[\cos(k\alpha) - \sin(k\alpha)] & (9.9) \\
Im_1(n) = 2^{-16} \cdot \sum_{k=0}^{3}[\cos(k\alpha) + \sin(k\alpha)] & (9.10) \\
Re_2(n) = 2^{-16} \cdot \sum_{k=0}^{3}[\cos(k\alpha) - \sin(k\alpha)] & (9.11) \\
Im_2(n) = 2^{-16} \cdot \sum_{k=0}^{3}[\cos(k\alpha) + \sin(k\alpha)] & (9.12) \\
Re_1(n) = Re_1(n) + V_4(n) & (9.13) \\
Re_1(n) = Re_1(n) + \cos(2\alpha) \cdot V_2(n) & (9.14) \\
Im_1(n) = Im_1(n) + \sin(2\alpha) \cdot V_2(n) & (9.15) \\
Re_1(n) = Re_1(n) + \cos(3\alpha) \cdot V_1(n) & (9.16) \\
Im_1(n) = Im_1(n) + \sin(3\alpha) \cdot V_1(n) & (9.17) \\
Re_1(n) = Re_1(n) + \cos(\alpha) \cdot V_3(n) & (9.18) \\
Im_1(n) = Im_1(n) + \sin(\alpha) \cdot V_3(n) & (9.19) \\
Re_1(n) = Re_1(n) + \cos(4\alpha) \cdot Re(n-1) & (9.20) \\
Im_1(n) = Im_1(n) + \cos(4\alpha) \cdot Im(n-1) & (9.21) \\
Re_1(n) = Re_1(n) - \sin(4\alpha) \cdot Im(n-1) & (9.22) \\
Im_1(n) = Im_1(n) + \sin(4\alpha) \cdot Re(n-1) & (9.23) \\
Re(n) = SAT[Re_1(n)] & (9.24) \\
Im(n) = SAT[Im1(n)] & (9.25) \\
Re_2(n) = Re_2(n) + V_8(n) & (9.26) \\
Re_2(n) = Re_2(n) + \cos(2\alpha) \cdot V_6(n) & (9.27)
\end{cases}$ $$\begin{cases} \text{Im}_2(n) = \text{Im}_2(n) + \sin(2\alpha) \cdot V_6(n) & (9.28) \\ \text{Re}_2(n) = \text{Re}_2(n) + \cos(3\alpha) \cdot V_5(n) & (9.29) \\ \text{Im}_2(n) = \text{Im}_2(n) + \sin(3\alpha) \cdot V_5(n) & (9.30) \\ \text{Re}_2(n) = \text{Re}_2(n) + \cos(\alpha) \cdot V_7(n) & (9.31) \\ \text{Im}_2(n) = \text{Im}_2(n) + \sin(\alpha) \cdot V_7(n) & (9.32) \\ \text{Re}_2(n) = \text{Re}_2(n) + \cos(4\alpha) \cdot \text{Re}(n) & (9.33) \\ \text{Im}_2(n) = \text{Im}_2(n) + \cos(4\alpha) \cdot \text{Im}(n) & (9.34) \\ \text{Re}_2(n) = \text{Re}_2(n) - \sin(4\alpha) \cdot \text{Im}(n) & (9.35) \\ \text{Im}_2(n) = \text{Im}_2(n) + \sin(4\alpha) \cdot \text{Re}(n) & (9.36) \\ \text{Re}(n) = SAT[\text{Re}_2(n)] & (9.37) \\ \text{Im}(n) = SAT[\text{Im}_2(n)] & (9.38) \end{cases}$$

$$P(F) = \text{Re}(N/8)^2 + \text{Im}(N/8)^2 \quad (9.39)$$

Assuming that constants are calculated, stored, and retrieved for later use, rather than re-calculated for each use, a DSP having four ALUs and two read/write operations per clock cycle using the formulation represented by Equations (9.1)-(9.39) would process an N-sample frame in N+O(1) clock cycles.

The formulations presented above, which refer to DSPs having 4 ALUs and 2 read/write operations per cycle, can be generalized for different multi-core (i.e., having multiple processors) DSPs. For a DSP with D ALUs and at least 2 read/write operations per cycle, the formulation of Equation (10) below may be used, where, unless otherwise indicated, variables are used in substantially the same way as described above.

$$\text{Re}_1(0) = 2^{-16} \cdot \sum_{m=0}^{N-1} \left[ \cos\left(\frac{2\pi F}{F_s} m\right) - \sin\left(\frac{2\pi F}{F_s} m\right) \right]$$

$$\text{Im}_1(0) = 2^{-16} \cdot \sum_{m=0}^{N-1} \left[ \cos\left(\frac{2\pi F}{F_s} m\right) + \sin\left(\frac{2\pi F}{F_s} m\right) \right]$$

$$\text{Re}_2(0) = \text{Im}_2(0) = 0$$

...

$$\text{Re}_D(0) = \text{Im}_D(0) = 0$$

for

-continued $$n = 0, 1, \ldots, \left[\frac{N}{D} - 1\right]$$

$$\begin{cases} V_a(n) = M \cdot x_{nD+a} \quad a = 1, 2, \ldots, D & (10.1) \\ \text{Re}_1(n+1) = \text{Re}_1(n) + V_1(n) \cdot \cos\left(\frac{2\pi F}{F_s}(N - Dn - 1)\right) & (10.2) \\ \text{Im}_1(n+1) = \text{Im}_1(n) + V_1(n) \cdot \sin\left(\frac{2\pi F}{F_s}(N - Dn - 1)\right) & (10.2') \\ \text{Re}_2(n+1) = \text{Re}_2(n) + V_2(n) \cdot \cos\left(\frac{2\pi F}{F_s}(N - Dn - 2)\right) & (10.3) \\ \text{Im}_2(n+1) = \text{Im}_2(n) + V_2(n) \cdot \sin\left(\frac{2\pi F}{F_s}(N - Dn - 2)\right) & (10.3') \\ \ldots \\ \text{Re}_D(n+1) = \text{Re}_D(n) + V_D(n) \cdot \cos\left(\frac{2\pi F}{F_s}(N - Dn - D)\right) & (10.D) \\ \text{Im}_D(n+1) = \text{Im}_D(n) + V_D(n) \cdot \sin\left(\frac{2\pi F}{F_s}(N - Dn - D)\right) & (10.D') \end{cases}$$

$$P(F) = SAT\left[ \begin{array}{l} 2^{-16} + \\ (SAT[\text{Re}_1(N/D) + \text{Re}_2(N/D) + \ldots + \text{Re}_D(N/D)])^2 + \\ (SAT[\text{Im}_1(N/D) + \text{Im}_2(N/D) + \ldots + \text{Im}_D(N/D)])^2 \end{array} \right]$$

Using the above formulation, D Re(n) and D Im(n) variables are initialized. Then, N/D iterations are run to process the samples in the frame, where each iteration takes D samples from the N-sample frame and performs 2D arithmetic operations. After all the samples are processed, power P(F) is calculated. Calculating power P(F) using the above formulation on a DSP with D ALUs would require 3N/D+O(1) clock cycles. That is so because, in each iteration, (a) the calculations of Equation (10.1) are performed in parallel in one clock cycle, then (b) the calculations of Equations (10.2)-(10.D) are performed in parallel in one clock cycle, and then (c) the calculations of Equations (10.2')-(10.D') are performed in parallel in one clock cycle.

A generic alternative implementation of the above formulation is represented by the formulation of Equation (11) below, where, unless otherwise indicated, the variables and functions retain the same meaning as above.

$$Re(0) = Im(0) = 0 \quad (11.1)$$

$$\text{for } n = 1, 2, \ldots, \quad (11.2)$$

$$\frac{N}{2D} \begin{cases} Re_1(n) = 2^{-16} \cdot \sum_{s=0}^{D}[\cos(s\alpha) - \sin(s\alpha)] + \sum_{s=1}^{D}[\cos(s\alpha) \cdot M \cdot x_{2Dn-D-s}] + \\ \qquad \cos(D\alpha) \cdot Re(n-1) - \sin(D\alpha) \cdot Im(n-1) + M \cdot x_{2Dn-D} \\ Im_1(n) = 2^{-16} \cdot \sum_{s=0}^{D}[\cos(s\alpha) + \sin(s\alpha)] + \sum_{s=1}^{D}[\sin(s\alpha) \cdot M \cdot x_{2Dn-D-s}] + \\ \qquad \sin(D\alpha) \cdot Re(n-1) + \cos(D\alpha) \cdot Im(n-1) \\ Re(n) = SAT(Re_1(n)), Im(n) = SAT(Im_1(n)) \\ Re_2(n) = 2^{-16} \cdot \sum_{s=0}^{D}[\cos(s\alpha) - \sin(s\alpha)] + \sum_{s=1}^{D}[\cos(s\alpha) \cdot M \cdot x_{2Dn-s}] + \\ \qquad \cos(D\alpha) \cdot Re(n) - \sin(D\alpha) \cdot Im(n) + M \cdot x_{2Dn} \\ Im_2(n) = 2^{-16} \cdot \sum_{s=0}^{D}[\cos(s\alpha) + \sin(s\alpha)] + \sum_{s=1}^{D}[\sin(s\alpha) \cdot M \cdot x_{2Dn-s}] + \\ \qquad \sin(D\alpha) \cdot Re(n) + \cos(D\alpha) \cdot Im(n) \\ Re(n) = SAT[Re_2(n)], Im(n) = SAT[Im_2(n)] \end{cases}$$

$$P(F) = Re(N/2D)^2 + Im(N/2D)^2 \quad (11.3)$$

A more-detailed formulation appears in Equation (12) below, where, unless otherwise noted, variables retain the same meaning as above.

$$Re(0) = Im(0) = 0$$

$$\begin{cases} V_a(n) = M \cdot x_{2Dn-2D+s} \qquad a = 1, 2, \ldots 2D & (12.1.1\text{-}12.1.2D) \\ Re1(n) = 2^{-16} \cdot \sum_{s=0}^{D-1}[\cos(s\alpha) - \sin(s\alpha)] & (12.2.1) \\ Im1(n) = 2^{-16} \cdot \sum_{s=0}^{D-1}[\cos(s\alpha) + \sin(s\alpha)] & (12.2.2) \\ Re2(n) = 2^{-16} \cdot \sum_{s=0}^{D-1}[\cos(s\alpha) - \sin(s\alpha)] & (12.2.3) \\ Im2(n) = 2^{-16} \cdot \sum_{s=0}^{D-1}[\cos(s\alpha) + \sin(s\alpha)] & (12.2.4) \\ Re1(n) = Re1(n) + V_D(n) & (12.3.1) \\ Re1(n) = Re1(n) + \cos(\alpha) \cdot V_{D-1}(n) & (12.3.2) \\ Im1(n) = Im1(n) + \sin(\alpha) \cdot V_{D-1}(n) & (12.3.3) \end{cases}$$

-continued $$Re1(n) = Re1(n) + \cos((D-1)\alpha) \cdot V_1(n) \quad (12.3.2D\text{-}2)$$
$$Im1(n) = Im1(n) + \sin((D-1)\alpha) \cdot V_1(n) \quad (12.3.2D\text{-}1)$$
$$Re1(n) = Re1(n) + \cos(D\alpha) \cdot Re(n-1) \quad (12.4.1)$$
$$Im1(n) = Im1(n) + \cos(D\alpha) \cdot Im(n-1) \quad (12.4.2)$$
$$Re1(n) = Re1(n) - \sin(D\alpha) \cdot Im(n-1) \quad (12.4.3)$$
$$Im1(n) = Im1(n) + \sin(D\alpha) \cdot Re(n-1) \quad (12.4.4)$$
$$Re(n) = SAT[Re1(n)] \quad (12.5.1)$$
$$Im(n) = SAT[Im1(n)] \quad (12.5.2)$$
$$Re2(n) = Re2(n) + V_{2D}(n) \quad (12.6.1)$$
$$Re2(n) = Re2(n) + \cos(\alpha) \cdot V_{2D-1}(n) \quad (12.6.2)$$
$$Im2(n) = Im2(n) + \sin(\alpha) \cdot V_{2K-1}(n) \quad (12.6.3)$$
$$\ldots$$
$$Re2(n) = Re2(n) + \cos((D-1)\alpha) \cdot V_{D+1}(n) \quad (12.6.2D\text{-}2)$$
$$Im2(n) = Im2(n) + \sin((D-1)\alpha) \cdot V_{D+1}(n) \quad (12.6.2D\text{-}1)$$
$$Re2(n) = Re2(n) + \cos(D\alpha) \cdot Re(n) \quad (12.7.1)$$
$$Im2(n) = Im2(n) + \cos(D\alpha) \cdot Im(n) \quad (12.7.2)$$
$$Re2(n) = Re2(n) - \sin(D\alpha) \cdot Im(n) \quad (12.7.3)$$
$$Im2(n) = Im2(n) + \sin(D\alpha) \cdot Re(n) \quad (12.7.4)$$
$$Re(n) = SAT[Re2(n)] \quad (12.8.1)$$
$$Im(n) = SAT[Im2(n)] \quad (12.8.2)$$

for $n = 1, 2, \ldots, \frac{N}{2D}$ $$P(F) = Re(N/2D)^2 + Im(N/2D)^2$$

Figure 4:
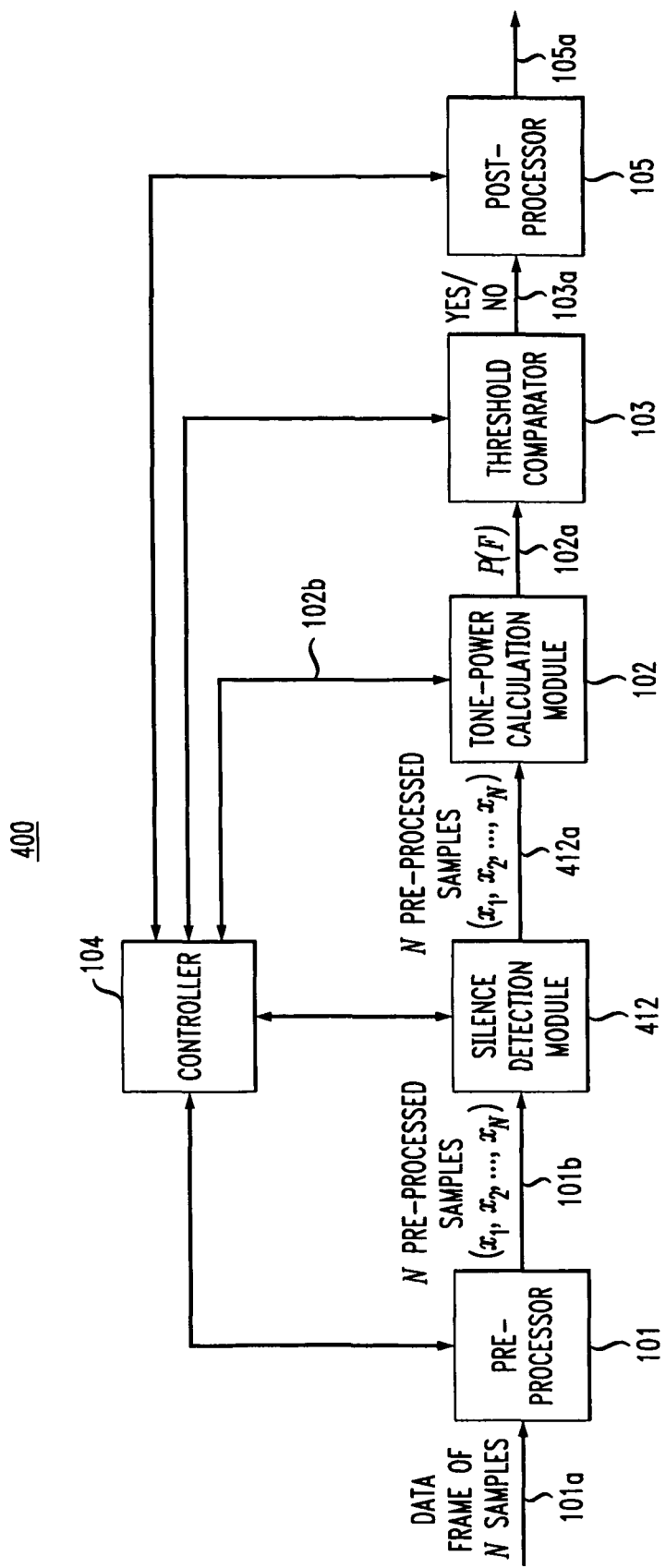
FIG. 4 shows a simplified block diagram of a tone-detection system in accordance with another embodiment of the invention.

FIG. 4 shows a simplified block diagram of tone-detection system 400 in accordance with another embodiment of the invention. Tone-detection system 400 contains many of the same modules as tone-detection system 100 of FIG. 1, but with the addition of silence-detection module 412, which receives frames of N pre-processed samples from pre-processor 101 via path 101b and conditionally provides those frames to tone-power calculation module 102 via path 412a. Silence-detection module 412 determines whether a received frame substantially represents silence. If a frame is determined to be substantially silence, then that frame is not provided to tone-power calculation module 102. Otherwise, the frame is provided to tone-power calculation module 102 to determine the presence of particular tones, as described above. It should be noted that silence-detection module 412 and tone-power calculation module 102 may be implemented using different DSPs or the same DSP, wherein the DSP functions as both silence-detection module 412 and tone-power calculation module 102. For example, a DSP, functioning as a silence-detection module, can receive a frame and first determine whether it is substantially silence and, if it determines that the frame is not silence, then the DSP, functioning as a tone-power calculation module, can calculate the power of a particular frequency in the frame.

In accordance with one implementation of silence-detection module 412, silence-detection module 412 reliably detects whether the energy in the 200 Hz-3400 Hz band is below −34 dBm. A second-order bypass filter to achieve that can be represented by Equation (13) below:

$$z_n = 0.825 \cdot x_n - 0.825 \cdot x_{n-2} - 0.16 \cdot z_{n-1} - 0.6499 \cdot z_{n-2} \quad (13)$$

If we denote $B_0=0.825$, $A_1=-0.16$, and $A_2=-0.6499$ and use saturation and additive correction (e.g., where $x_k$ and $z_k$ are in Qc.15 format, and arithmetic operations provide Qc.31 results), then we can represent Equation (13) for an N-sample frame according to Equation (14) as follows:

$$z_n = 2^{-16} + B_0 \cdot x_n - B_0 \cdot x_{n-2} + A_1 \cdot z_{n-1} + A_2 \cdot z_{n-2}] \quad (14)$$

for $n=1, 2, \ldots, N$

A prior-art DSP would require at least $2 \cdot N$ clock cycles to process an N-sample frame. One implementation of silence-detection module 412 can process an N-sample frame, comprising samples $x_1, x_2, \ldots, x_N$, in $1.5 \cdot N + O(1)$ clock cycles using a filter represented by the algorithm of Equation (15) below, where the terms have the values described above.

$$z_n = 2^{-16} + B_0 \cdot x_n - B_0 \cdot x_{n-2} + A_1 \cdot z_{n-1} + A_2 \cdot z_{n-2} \quad (15.1)$$

$$z_{n-1} = 2^{-16} + B_0 \cdot x_{n-1} - B_0 \cdot x_{n-3} + A_1 \cdot z_{n-2} + A_2 \cdot z_{n-3} \quad (15.2)$$

for $n=2, 4, 6, \ldots, N$

Or, alternatively, the implementation can be represented by the algorithm of Equation (16) below, where the term $A_{1 \cdot 2}$ represents $A_1 \cdot A_2$, the term $A_{1 \cdot 1 + 2}$ represents $A_1 \cdot A_1 + A_2$, and $2^{-16}$ is an additive correction.

$$z_n = 2^{-16} + B_0 \cdot x_n - B_0 \cdot x_{n-2} + A_1 \cdot (2^{-16} + B_0 \cdot x_{n-1} - B_0 \cdot x_{n-3}) + A_{1 \cdot 1+2} \cdot z_{n-2} + A_{1 \cdot 2} \cdot z_{n-3} \quad (16.1)$$

$$z_{n-1} = 2^{-16} + B_0 \cdot x_{n-1} - B_0 \cdot x_{n-3} + A_1 \cdot z_{n-2} + A_2 \cdot z_{n-3} \quad (16.2)$$

for $n=2, 4, 6, \ldots, N$

The algorithm represented by Equation (16) takes samples $x_n, x_{n-1}, x_{n-2}, x_{n-3}$, and results $z_{n-2}, z_{n-3}$ and iteratively calculates $z_n$ and $z_{n-1}$. Each iteration of the algorithm takes up three clock cycles. As a result, the total number of clock cycles required to process an N-sample frame is 1.5·N+O(1). Silence-detection module 412 can implement Equation (16) by processing 3 iterations of the algorithm together in 9 clock cycles. In other words, 6 inputs (4 samples and 2 results) are handled every 9 clock cycles. A more-detailed representation of Equation (16) for silence-detection module 412 is provided as Equation (17) below.

$$q_n = 2^{-16} \quad (17.1)$$

$$q_{n-1} = 2^{-16} \quad (17.2)$$

$$q_n = q_n - B_0 \cdot x_{n-2} \quad (17.3)$$

$$q_{n-1} = q_{n-1} - B_0 \cdot x_{n-3} \quad (17.4)$$

$$\text{read } x_{n-1} \text{ and } x_n \quad (17.5)$$

$$q_n = q_n + B_0 \cdot x_n \quad (17.6)$$

$$q_{n-1} = q_{n-1} + B_0 \cdot x_{n-1} \quad (17.7)$$

$$z_n = q_n \quad (17.8)$$

$$z_{n-1} = q_{n-1} \quad (17.9)$$

$$z_n = z_n + A_1 \cdot z_{n-1} \quad (17.10)$$

$$z_n = z_n + A_{1 \cdot 2} \cdot z_{n-3} \quad (17.11)$$

$$z_{n-1} = z_{n-1} + A_2 \cdot z_{n-3} \quad (17.12)$$

$$z_n = z_n + A_{1 \cdot 1+2} \cdot z_{n-2} \quad (17.13)$$

$$z_{n-1} = z_{n-1} + A_1 \cdot z_{n-2} \quad (17.14)$$

$$\text{write } z_{n-1} \text{ and } z_n \quad (17.15)$$

for n=2, 4, 6, ..., N

Silence-detection module 412 performs operations (17.1)-(17.15) as shown as Equation (18) below, where (a) the square brackets denote a set of operations that are executed in parallel in one clock cycle and (b) the subscript indexes (e.g., "s," "s−1," and "s−2") mean indexes of iterations. For example, operations (17.1) and (17.2) of the iteration n=s are performed together with (i.e., in the same clock cycle as) operation (17.8) and (17.9) of the iteration n=s−2 and operations (17.11) and (17.12) of the iteration n=s−4.

$$\begin{bmatrix} (17.1)_s, (17.2)_s, & (17.8)_{s-2}, (17.9)_{s-2}, & (17.11)_{s-4}, (17.12)_{s-4} \\ (17.3)_s, (17.4)_s, (17.5)_s, & & (17.13)_{s-4}, (17.14)_{s-4} \\ (17.6)_s, (17.7)_s, & (17.10)_{s-2}, & (17.15)_{s-4} \end{bmatrix} \quad (18)$$

It should be noted that the above-described implementation for silence-detection module 412 is designed for N-sample frames where N mod 6=4. For example, for N=40, 40 mod 6=4. As would be appreciated by one of ordinary skill in the art, the described algorithm may be modified for frames of other lengths.

In an alternative embodiment of silence-detection module 412, silence-detection module 412 uses a multi-processor DSP having m ALUs and multiple read-write operations per clock cycle that is able to perform multiple operations in parallel. A filter for such a multi-ALU DSP can be represented by the formulation of Equation (19) below:

$$z_n = 2^{-16}(1+B_0+B_1+\ldots+B_{m-3})+B_0(x_n-x_{n-2})+ \\ B_1(x_{n-1}-x_{n-3})+B_2(x_{n-2}-x_{n-4})+\ldots+ \\ B_{m-3}(x_{n-m-3}-x_{n-m-5})+B_{m-2} \cdot z_{n-m+2}+B_{m-1} \cdot z_{n-m+1} \quad (19)$$

Since $B_i$ does not depend on n, the values of $B_i$ may be pre-calculated and stored in a memory for use as needed. Values for $B_i$ may be calculated recursively using the algorithm of Equation (20) below.

$$B_0 = B_0, \quad (20.1)$$

$$B_1 = A_1 \cdot B_0 \quad (20.2)$$

For i=2 to m−3, $$B_i = A_1 \cdot B_{i-1} + A_2 \cdot B_{i-2} \quad (20.3)$$

Thus, for example, $B_2 = A_2 \cdot B_0 + (A_1)^2 \cdot B_0$ and $B_3 = B_0 \cdot (2 \cdot A_1 \cdot A_2 + (A_1)^3)$.

Equation (19) can be transformed for implementation using silence-detection module 412 according to Equation (21) as follows, where $q_n$ is the output:

$$q_n = 2^{-16}(1+B_0+B_1+\ldots+B_{m-3}) \quad (21.1)$$

$$q_n = q_n + B_{m-3} \cdot (x_{n-m-3} - x_{n-m-5}) \quad (21.2)$$

...

$$q_n = q_n + B_1 \cdot (x_{n-1} - x_{n-3}) \quad (21.m-2)$$

$$\text{read } x_n, x_{n-2} \quad (21.m-1)$$

$$d_n = x_n - x_{n-2} \quad (21.m)$$

$$q_n = q_n + B_0 \cdot d_n \quad (21.m+1)$$

$$q_n = q_n + B_{m+1} \cdot q_{n-m} \quad (21.m+2)$$

$$\text{write } q_n \quad (21.m+3)$$

for n=m+1, m+2, m+3, ..., N

Silence-detection module 412 performs operations (21.1)-(21.m+3) as shown in Equation (22) below, where (a) the square brackets denote a set of operations that are executed in one clock cycle and (b) the subscript indexes (e.g., "s," "s−1," and "s−2") mean indexes of iterations.

$$[(21.1)_s, (21.2)_{s-1}, (21.3)_{s-2}, \ldots (21.m+2)_{s-m-1}, (21.m+3)_{s-m-2},] \quad (22)$$

It should be noted that operations (21.1), (21.m−1), and (21.m+3) are read/write operations, while the others are arithmetic operations. Note that operation (21.1) here is a read operation because the value of $2^{-16}(1+B_0+B_1+\ldots+B_{m-3})$ is pre-calculated and operation (21.1) consists of loading that pre-calculated value into $q_n$. As can be seen, one clock cycle is needed to implement one step of the iteration. However, approximately m clock cycles are needed to get to the point where all the operations can be performed simultaneously since the operational pipeline needs to be filled. For example, if silence-detection module 412 uses 4 ALUs, then, on the second iteration (e.g., s=2), only operations from the first two iterations can be performed. Once s>=m+3, all the algorithms of Equation (21) can be implemented simultaneously. Thus, a total of N+m+3 clock cycles are needed to process one N-sample frame of data. It should be further noted that silence-detection module 412 needs to be able to perform at least three read/write operations per clock cycle in this implementation.

Embodiments of the invention have been described in the context of DTMF telephony signals. The invention is not limited to DTMF tones or telephony applications. Some alternative embodiments are used for tone-power calculation and/or silence detection in contexts outside of DTMF signals. Some alternative embodiments are used for tone-power calculation and/or silence detection in contexts outside of telephony.

An embodiment of the invention has been described where the silence-detection module 412 of FIG. 4 is used in conjunction with tone-power calculation module 102. In an alternative implementation, silence-detection module 412 is used independently of a tone-power calculation module.

Embodiments of the invention have been described wherein a pre-processor, a threshold comparator, and a post-processor are used. These devices are not necessary for the invention. Alternative embodiments of the invention are implemented without one or more of a pre-processor, threshold comparator, and post-processor.

Embodiments of the invention have been described wherein the frames comprise 40 samples. As already noted, data frames of different sizes are possible. Alternative embodiments of the invention process data frames having a number of samples other than 40.

An embodiment of the invention has been described where the silence-detection module was shown as separate from the pre-processor. In an alternative embodiment, the silence-detection module is part of the pre-processor. In general, as also indicated elsewhere, the various modules described may be physically implemented in a wide variety of ways, as would be appreciated by one of ordinary skill in the art.

References herein to the verb "to set" and its variations in reference to values of fields do not necessarily require an active step and may include leaving a field value unchanged if its previous value is the desired value. Setting a value may nevertheless include performing an active step even if the previous or default value is the desired value.

As used herein in reference to data transfers between entities in the same device, and unless otherwise specified, the terms "receive" and its variants can refer to receipt of the actual data, or the receipt of one or more pointers to the actual data, wherein the receiving entity can access the actual data using the one or more pointers.

Exemplary embodiments have been described wherein particular entities (a.k.a. modules) perform particular functions. However, the particular functions may be performed by any suitable entity and are not restricted to being performed by the particular entities named in the exemplary embodiments.

References herein to the verb "to generate" and its variants in reference to information or data do not necessarily require the creation and/or storage of new instances of that information. The generation of information could be accomplished by identifying an accessible location of that information. The generation of information could also be accomplished by having an algorithm for obtaining that information from accessible other information.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, microcontroller, or general-purpose computer.

It will be further understood that various changes in the details, materials, and arrangements of the parts which have been described and illustrated in order to explain the nature of this invention may be made by those skilled in the art without departing from the scope of the invention as expressed in the following claims.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Unless explicitly stated otherwise, each numerical value and range should be interpreted as being approximate as if the word "about" or "approximately" preceded the value of the value or range. As used in this application, unless otherwise explicitly indicated, the term "connected" is intended to cover both direct and indirect connections between elements.

For purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. The terms "directly coupled," "directly connected," etc., imply that the connected elements are either contiguous or connected via a conductor for the transferred energy.

The use of figure numbers and/or figure reference labels in the claims is intended to identify one or more possible embodiments of the claimed subject matter in order to facilitate the interpretation of the claims. Such use is not to be construed as limiting the scope of those claims to the embodiments shown in the corresponding figures.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

We claim:

1. A digital signal processor (DSP) comprising a plurality of D arithmetic logic units (ALUs), wherein the DSP is adapted to:

receive an N-sample data frame comprising digital samples corresponding to an audio signal; and perform tone detection for the data frame using the ALUs of the plurality of D ALUs in parallel, wherein the tone detection comprises:

(i) determining a power P(F) of a frequency F for the data frame by performing the following operations on the N-sample data frame:

(a) generate $V_a(n)$ where $V_a(n) = M \cdot x_{nD+a}$, for $a = 1, \ldots, D$ and $n = 0, \ldots, [N/D-1]$, wherein the DSP is adapted to perform operation (a) in one clock cycle for at least one value of n by using all of the ALUs of the plurality of D ALUs in parallel;

(b) generate $\text{Re}_a(n+1)$ where $\text{Re}_a(n+1) = \text{Re}_a(n) + V_a(n) \cdot \cos\left(\frac{2\pi F}{F_s}(n - Dn - a)\right)$, for a=1, ..., D and n=0, ..., [N/D−1], wherein the DSP is adapted to perform operation (b) in one clock cycle for at least one value of n by using all of the ALUs of the plurality of D ALUs in parallel; and (c) generate $\text{Im}_a(n+1)$ where $\text{Im}_a(n+1) = \text{Im}_a(n) + V_a(n) \cdot \sin\left(\frac{2\pi F}{F_s}(n - Dn - a)\right)$, for a=1, ..., D and n=0, ..., [N/D−1], wherein the DSP is adapted to perform operation (c) in one clock cycle for at least one value of n by using all of the ALUs of the plurality of D ALUs in parallel, wherein $V_a(k)$, $\text{Re}_a(k)$, and $\text{Im}_a(k)$ are storage variables, $F_s$ is a sampling frequency for the data frame, $x_i$ is the ith sample of the data frame, a, k, and n are counting variables, and M is a normalization factor; and (ii) thresholding the determined power P(F) to determine whether a tone corresponding to the frequency F is present in the audio signal.

2. The DSP of claim 1, wherein the DSP is adapted to determine the power P(F) in accordance with the equation $$P(F) = SAT\left[A + \left(SAT\left[\text{Re}_1\left(\frac{N}{D}\right) + \text{Re}_2\left(\frac{N}{D}\right) + \ldots + \text{Re}_D\left(\frac{N}{D}\right)\right]\right)^2 + \left(SAT\left[\text{Im}_1\left(\frac{N}{D}\right) + \text{Im}_2\left(\frac{N}{D}\right) + \ldots + \text{Im}_D\left(\frac{N}{D}\right)\right]\right)^2\right],$$

where SAT[ ] is a saturation function and A is an additive correction.

3. The DSP of claim 1, wherein the DSP is adapted to:
(A) initialize $\text{Re}_1(0)$ to $$A \cdot \sum_{m=0}^{N-1}\left[\cos\left(\frac{2\pi F}{F_s}m\right) - \sin\left(\frac{2\pi F}{F_s}m\right)\right];$$

(B) initialize $\text{Im}_1(0)$ to $$A \cdot \sum_{m=0}^{N-1}\left[\cos\left(\frac{2\pi F}{F_s}m\right) + \sin\left(\frac{2\pi F}{F_s}m\right)\right];$$

and
(C) initialize $\text{Re}_j(0)$ and $\text{Im}_j(0)$ to 0 for j=2, ..., D, wherein A is an additive correction and m and j are counting variables.

4. The DSP of claim 3, wherein the DSP is adapted to determine the power P(F) in accordance with the equation $$P(F) = SAT\left[A + \left(SAT\left[\text{Re}_1\left(\frac{N}{D}\right) + \text{Re}_2\left(\frac{N}{D}\right) + \ldots + \text{Re}_D\left(\frac{N}{D}\right)\right]\right)^2 + \left(SAT\left[\text{Im}_1\left(\frac{N}{D}\right) + \text{Im}_2\left(\frac{N}{D}\right) + \ldots + \text{Im}_D\left(\frac{N}{D}\right)\right]\right)^2\right],$$

where SAT[ ] is a saturation function and A is an additive correction.

5. The DSP of claim 1, wherein the DSP is adapted to perform silence detection for the data frame (i) prior to performing tone detection and (ii) using the ALUs of the plurality of D ALUs in parallel, wherein the silence detection comprises filtering a given frequency range of the signal.

6. The DSP of claim 5, wherein the filtering uses the filter equation below:

$$z_n = A \cdot (1 + B_0 + B_1 + \ldots + B_{D-3}) + B_0(x_n - x_{n-2}) + B_1(x_{n-1} - x_{n-3}) + B_2(x_{n-2} - x_{n-4}) + \ldots + B_{D-3}(x_{n-D-3} - x_{n-D-5}) + B_{D-2}z_{n-D+2} + B_{D-1}z_{n-D+1},$$

where A is an additive correction, $B_i$ is the ith multiplicative factor, $x_i$ is the ith sample of the data frame, and $z_n$ is the filter output.

7. A digital signal processor (DSP) comprising a plurality of 4 arithmetic logic units (ALUs), wherein the DSP is adapted to:

receive an N-sample data frame comprising digital samples corresponding to an audio signal; and perform tone detection for the data frame using the ALUs of the plurality of 4 ALUs in parallel, wherein the tone detection comprises:

(i) determining a power P(F) of a frequency F for the data frame by performing the following operations for n=1, ..., N/4, wherein the DSP reads a sequential 4-sample group from the N-sample data frame for each value of n:

(a) generate $V_a(n)$ where $V_a(n) = M \cdot x_{4n-4+a}$, for a=1, ..., 4;

(b) generate $\text{Re}_1(n)$ where $$\text{Re}_1(n) = \text{Re}_1(n-1) + V_1(n) \cdot \cos\left(\frac{2\pi F}{F_s}(N - 4n + 3)\right);$$

(c) generate $\text{Im}_1(n)$ where $$\text{Im}_1(n) = \text{Im}_1(n-1) + V_1(n) \cdot \sin\left(\frac{2\pi F}{F_s}(N - 4n + 3)\right);$$

(d) generate $\text{Re}_2(n)$ where $$\text{Re}_2(n) = \text{Re}_2(n-1) + V_2(n) \cdot \cos\left(\frac{2\pi F}{F_s}(N - 4n + 2)\right);$$

(e) generate $\text{Im}_2(n)$ where $$\text{Im}_2(n) = \text{Im}_2(n-1) + V_2(n) \cdot \sin\left(\frac{2\pi F}{F_s}(N - 4n + 2)\right);$$

(f) generate $Re_1(n)$ where $$Re_1(n) = Re_1(n) + V_3(n) \cdot \cos\left(\frac{2\pi F}{F_s}(N - 4n + 1)\right);$$

(g) generate $Im_1(n)$ where $$Im_1(n) = Im_1(n) + V_3(n) \cdot \sin\left(\frac{2\pi F}{F_s}(N - 4n + 1)\right);$$

(h) generate $Re_2(n)$ where $$Re_2(n) = Re_2(n) + V_4(n) \cdot \cos\left(\frac{2\pi F}{F_s}(N - 4n)\right);$$

and
(i) generate $Im_2(n)$ where $$Im_2(n) = Im_2(n) + V_4(n) \cdot \sin\left(\frac{2\pi F}{F_s}(N - 4n)\right),$$

wherein $V_a(n)$, $Re_1(n)$, $Re_2(n)$, $Im_1(n)$, and $Im_2(n)$ are storage variables, $F_s$ is the sampling frequency for the data frame, $x_i$ is the ith sample of the data frame, a is a counting variable, and M is a normalization factor; and
(ii) thresholding the determined power P(F) to determine whether a tone corresponding to the frequency F is present in the audio signal.

8. The DSP of claim 7, wherein the DSP is adapted to determine the power P(F) in accordance with the equation $$P(F) = SAT\left[A + \left(SAT\left[Re_1\left(\frac{N}{4}\right) + Re_2\left(\frac{N}{4}\right)\right]\right)^2 + \left(SAT\left[Im_1\left(\frac{N}{4}\right) + Im_2\left(\frac{N}{4}\right)\right]\right)^2\right],$$

wherein SAT[ ] is a saturation function and A is an additive correction.

9. The DSP of claim 7, wherein the DSP is adapted to:
(A) initialize $Re_1(0)$ to $$A \cdot \sum_{m=0}^{N-1}\left[\cos\left(\frac{2\pi F}{F_s}m\right) - \sin\left(\frac{2\pi F}{F_s}m\right)\right];$$

(B) initialize $Im_1(0)$ to $$A \cdot \sum_{m=0}^{N-1}\left[\cos\left(\frac{2\pi F}{F_s}m\right) + \sin\left(\frac{2\pi F}{F_s}m\right)\right];$$

and
(C) initialize $Re_2(0)$ and $Im_2(0)$ to 0, wherein A is an additive correction and m is a counting variable.

10. The DSP of claim 7, wherein the DSP is adapted to:
perform operations (a) in one clock cycle for any one value of n by using all the ALUs of the plurality of 4 ALUs in parallel;

perform operations (b)-(e) in one clock cycle for any one value of n by using all the ALUs of the plurality of 4 ALUs in parallel; and perform operations (f)-(i) in one clock cycle for any one value of n by using all the ALUs of the plurality of 4 ALUs in parallel.

11. The DSP of claim 7, wherein the DSP is adapted to perform silence detection for the data frame (i) prior to performing tone detection and (ii) using all the ALUs of the plurality of 4 ALUs in parallel, wherein the silence detection comprises filtering a given frequency range of the signal.

12. The DSP of claim 11, wherein the filtering uses the filter equation below:

$$z_n = A \cdot (1 + B_0 + B_1 + \ldots + B_{D-3}) + B_0(x_n - x_{n-2}) + B_1(x_{n-1} - x_{n-3}) + B_2(x_{n-2} - x_{n-4}) + \ldots + B_{D-3}(x_{n-D-3} - x_{n-D-5}) + B_{D-2} \cdot z_{n-D+2} + B_{D-1} \cdot z_{n-D+1},$$

where A is an additive correction, $B_i$ is the ith multiplicative factor, $x_i$ is the ith sample of the data frame, and $z_n$ is the filter output.

13. A digital signal processor (DSP) comprising a plurality of D arithmetic logic units (ALUs), wherein the DSP is adapted to:
receive an N-sample data frame comprising digital samples corresponding to an audio signal; and
perform tone detection for the data frame using the ALUs of the plurality of D ALUs in parallel, wherein the tone detection comprises:
(i) determining a power P(F) of a frequency F for the data frame by performing the following operations on the N-sample data frame:
(a) initialize Re(0) and Im(0) to 0;
(b) for n=1, . . . , [N/2D]:
(1) generate $Re_1(n)$ where $$Re_1(n) = A \cdot \sum_{s=0}^{D}[\cos(s\alpha) - \sin(s\alpha)] + \sum_{s=1}^{D}[\cos(s\alpha) \cdot M \cdot x_{2Dn-D-s}] + \cos(D\alpha) \cdot Re(n-1) - \sin(D\alpha) \cdot Im(n-1) + M \cdot x_{2Dn-D};$$

(2) generate $Im_1(n)$ where $$Im_1(n) = A \cdot \sum_{s=0}^{D}[\cos(s\alpha) + \sin(s\alpha)] + \sum_{s=1}^{D}[\sin(s\alpha) \cdot M \cdot x_{2Dn-D-s}] + \sin(D\alpha) \cdot Re(n-1) + \cos(D\alpha) \cdot Im(n-1);$$

(3) generate Re(n) where $Re(n) = SAT[Re_1(n)]$;
(4) generate Im(n) where $Im(n) = SAT[Im_1(n)]$;
(5) generate $Re_2(n)$ where $$Re_2(n) = A \cdot \sum_{s=0}^{D}[\cos(s\alpha) - \sin(s\alpha)] + \sum_{s=1}^{D}[\cos(s\alpha) \cdot M \cdot x_{2Dn-s}] + \cos(D\alpha) \cdot Re(n) - \sin(D\alpha) \cdot Im(n) + M \cdot x_{2Dn};$$

and
(6) generate $\text{Im}_2(n)$ where $$\text{Im}_2(n) = A \cdot \sum_{s=0}^{D} [\cos(s\alpha) + \sin(s\alpha)] + \sum_{s=1}^{D} [\sin(s\alpha) \cdot M \cdot x_{2Dn-s}] + \sin(D\alpha) \cdot \text{Re}(n) + \cos(D\alpha) \cdot \text{Im}(n);$$

(7) generate $\text{Re}(n)$ where $\text{Re}(n) = \text{SAT}[\text{Re}_2(n)]$;
(8) generate $\text{Im}(n)$ where $\text{Im}(n) = \text{SAT}[\text{Im}_2(n)]$; and
(c) generate $P(F)$ where $P(F) = \text{Re}(N/2D)^2 + \text{Im}(N/2D)^2$, wherein $\text{Re}(n)$, $\text{Re}_1(n)$, $\text{Re}_2(n)$, $\text{Im}(n)$, $\text{Im}_1(n)$, and $\text{Im}_2(n)$ are storage variables, s is a counting variable, A is an additive correction, M is a normalization factor, SAT[ ] is a saturation function, and $\alpha$ is $2\pi F/F_s$, where $F_s$ is a sampling frequency for the data frame; and
(ii) thresholding the determined power $P(F)$ to determine whether a tone corresponding to the frequency F is present in the audio signal.

14. The DSP of claim 13, wherein the DSP is adapted to perform silence detection for the data frame (i) prior to performing tone detection and (ii) using the ALUs of the plurality of D ALUs in parallel, wherein the silence detection comprises filtering a given frequency range of the signal.

15. The DSP of claim 14, wherein the filtering uses the filter equation below:

$$z_n = A \cdot (1 + B_0 + B_1 + \ldots + B_{D-3}) + B_0(x_n - x_{n-2}) + B_1(x_{n-1} - x_{n-3}) + B_2(x_{n-2} - x_{n-4}) + \ldots + B_{D-3}(x_{n-D-3} - x_{n-D-5}) + B_{D-2} z_{n-D+2} + B_{D-1} z_{n-D+1},$$

where A is an additive correction, $B_i$ is the ith multiplicative factor, $x_i$ is the ith sample of the data frame, and $z_n$ is the filter output.

16. A digital signal processor (DSP) comprising a plurality of D arithmetic logic units (ALUs), wherein:
the DSP is adapted to:
receive an N-sample data frame comprising digital samples corresponding to an audio signal; and
perform silence detection for the data frame using the ALUs of the plurality of D ALUs in parallel, wherein the silence detection comprises filtering a given frequency range of the signal; and
the filtering uses the filter equation below:

$$z_n = A \cdot (1 + B_0 + B_1 + \ldots + B_{D-3}) + B_0(x_n - x_{n-2}) + B_1(x_{n-1} - x_{n-3}) + B_2(x_{n-2} - x_{n-4}) + \ldots + B_{D-3}(x_{n-D-3} - x_{n-D-5}) + B_{D-2} z_{n-D+2} + B_{D-1} z_{n-D+1},$$

where A is an additive correction, $B_i$ is the ith multiplicative factor, $x_i$ is the ith sample of the data frame, and $z_n$ is the filter output.

17. The DSP of claim 16, wherein:
(A) $B_0 = B_0$;
(B) $B_1 = A \cdot B_0$; and
(C) for i=2 to D-3
$B_i + A_2 \cdot B_{i-2}$, where $A_i$ and $B_i$ are multiplicative factors.

18. The DSP of claim 17, wherein $B_0$ is 0.825, $A_1$ is −0.16, and $A_2$ is −0.6499.

19. A digital signal processor (DSP) comprising a plurality of D arithmetic logic units (ALUs), wherein:
the DSP is adapted to:
receive an N-sample data frame comprising digital samples corresponding to an audio signal; and
perform silence detection for the data frame using the ALUs of the plurality of D ALUs in parallel, wherein the silence detection comprises filtering a given frequency range of the signal; and
the DSP comprises at least four ALUs and silence detection comprises performing the filtering operations below for n=2, 4, 6, ..., N:
(1) $q_n = A$;
(2) $q_{n-1} = A$;
(3) $q_n = q_n - B_0 \cdot x_{n-2}$;
(4) $q_{n-1} = q_{n-1} - B_0 \cdot x_{n-3}$;
(5) read $x_{n-1}$ and $x_n$;
(6) $q_n = q_n + B_0 \cdot x_n$;
(7) $q_{n-1} = q_{n-1} + B_0 \cdot x_{n-1}$;
(8) $z_n = q_n$;
(9) $z_{n-1} = q_{n-1}$;
(10) $z_n = z_n + A_1 \cdot z_{n-1}$;
(11) $z_n = z_n + A_{1 \cdot 2} \cdot z_{n-3}$;
(12) $z_{n-1} = z_{n-1} + A_2 \cdot z_{n-3}$;
(13) $z_n = z_n + A_{1 \cdot 1 + 2} \cdot z_{n-2}$;
(14) $z_{n-1} = z_{n-1} + A_1 \cdot z_{n-2}$; and
(15) write $z_{n-1}$ and $z_n$, where $z_k$ is an output of the silence detection, $q_k$ is storage variable, A is an additive correction, k and n are counting variables, $B_0$, $A_1$, and $A_2$ are multiplicative factors, $A_{1 \cdot 2}$ represents $A_1 \cdot A_2$, and $A_{1 \cdot 1 + 2}$ represents $A \cdot A_1 + A_2$.

20. The DSP of claim 19, wherein the DSP is adapted to perform:
(A) operations (1)s, (2)s, (8)s−2, (9)s−2, (11)s−4, (12)s−4 in parallel and in one clock cycle;
(B) operations (3)s, (4)s, (5)s, (13)s−4, (14)s−4 in parallel and in one clock cycle; and
(C) operations (6)s−2, (7)s−2, (10)s−2, (15)s−4 in parallel and in one clock cycle, where the subscript indices s, s−2, and s−4 correspond to values of n for which the corresponding operation is performed.

21. A digital signal processor (DSP) comprising a plurality of D arithmetic logic units (ALUs), wherein:
the DSP is adapted to:
receive an N-sample data frame comprising digital samples corresponding to an audio signal; and
perform silence detection for the data frame using the ALUs of the plurality of D ALUs in parallel, wherein the silence detection comprises filtering a given frequency range of the signal;
the filtering uses the filter equation below:

$$z_n = A \cdot (1 + B_0 + B_1 + \ldots + B_{D-3}) + B_0(x_n - x_{n-2}) + B_1(x_{n-1} - x_{n-3}) + B_2(x_{n-2} - x_{n-4}) + \ldots + B_{D-3}(x_{n-D-3} - x_{n-D-5}) + B_{D-2} z_{n-D+2} + B_{D-1} z_{n-D+1},$$

where A is an additive correction, $B_i$ is the ith multiplicative factor, $x_i$ is the ith sample of the data frame, and $z_n$ is the filter output; and
the DSP performs tone detection for the data frame if and only if the DSP determined, in performing the silence detection for the data frame, that the data frame does not represent silence.

22. The DSP of claim 21, wherein the DSP performs tone detection for the data frame (i) after performing the silence detection and (ii) using the ALUs of the plurality of D ALUs in parallel, wherein the tone detection comprises (i) determining a power $P(F)$ of a frequency F for the data frame and (ii) thresholding the determined power $P(F)$ to determine whether a tone corresponding to the frequency F is present in the audio signal.

* * * * *

UNITED STATES PATENT AND TRADEMARK OFFICE
CERTIFICATE OF CORRECTION

PATENT NO. : 8,761,916 B2  
APPLICATION NO. : 13/124474  
DATED : June 24, 2014  
INVENTOR(S) : Aleksey Alexandrovich Letunovskiy et al.

Page 1 of 1

It is certified that error appears in the above-identified patent and that said Letters Patent is hereby corrected as shown below:

In the Claims

Column 23, line 4, claim 1, replace:

"where $Re_a(n+1) = Re_a(n) + V_a(n) \cdot \cos(2\pi F/F_s (n-D_n-a))$,"

with:

--where $Re_a(n+1) = Re_a(n) + V_a(n) \cdot \cos(2\pi F/F_s (N-D_n-a))$.--

Column 23, line 15, claim 1, replace:

"where $Im_a(n+1) = Im_a(n) + V_a(n) \cdot \sin(2\pi F/F_s (n-D_n-a))$,"

with:

--where $Im_a(n+1) = Im_a(n) + V_a(n) \cdot \sin(2\pi F/F_s (N-D_n-a))$,--

Column 27, line 56, claim 17, replace:

"$B_1 = A \cdot B_0$; and"

with:

--$B_1 = A_1 \cdot B_0$; and--

Column 27, line 58, claim 17, replace:

"$B_i + A_2 \cdot B_{i-2}$, where $A_i$ and $B_i$ are multiplicative factors."

with

--$B_i = A_1 \cdot B_{i-1} B_i + A_2 \cdot B_{i-2}$, where $A_i$ and $B_i$ are multiplicative factors.--

Signed and Sealed this  
Seventeenth Day of February, 2015

Michelle K. Lee  
*Deputy Director of the United States Patent and Trademark Office*